Nov. 4, 1969   D. J. WHEELER   3,476,000
STRIP SHEARING APPARATUS
Filed Aug. 18, 1966   3 Sheets-Sheet 3

INVENTOR
DONALD J. WHEELER

BY Oberlin, Maky & Donnelly
ATTORNEYS

United States Patent Office 3,476,000
Patented Nov. 4, 1969

3,476,000
STRIP SHEARING APPARATUS
Donald James Wheeler, Kent, Ohio, assignor to Roller Shear Corporation, Cleveland, Ohio, a corporation of Ohio
Filed Aug. 18, 1966, Ser. No. 573,374
Int. Cl. B26d 7/02, 1/20
U.S. Cl. 83—162          5 Claims

ABSTRACT OF THE DISCLOSURE

A shearing apparatus including a stationary shear assembly and a movable shear assembly disposed above the stationary shear assembly adapted to cooperate to shear material disposed therebetween, said movable shear assembly being supported below the stationary shear assembly in such a manner that the compressive forces acting on the stationary shear assembly during shearing will act through the support for the movable shear assembly to neutralize the opposing forces acting on the movable shear assembly.

---

The present invention relates generally, as indicated to strip shearing apparatus and, more particularly, to a relatively compact shearing apparatus of simple construction which may be positioned in a relatively confined area in a strip processing line or the like for quickly and easily shearing metal, plastic, or coated metal strips, sheets, and plates as required.

In strip processing lines, it is generally necessary to shear fishtails or other irregular end configurations from the ends of thin metal strips or plates prior to joining since otherwise they might interfere with the joining operation. Moreover, during processing of the strips, the joints are usually cut out as scrap and there are often many other strip cutting operations as well. Accordingly, there is a great need for a relatively simple and inexpensive shearing apparatus for shearing strip material, especially one that is quite compact and easily installed in the minimum amount of space that may be available in a strip processing line, which is a principal object of this invention.

Another object is to provide a strip shearing apparatus in which the upper shear knives are supported from below the lower shear knives, thereby eliminating the need for the large superstructure that is usually provided for the upper shear knives.

A further object is to provide such a shearing apparatus in which the upper shear knives are mounted on a carriage guided for movement by guideways located below the lower stationary shear knives, whereby the shear forces created during the shearing operation tending to force the upper shear knives away from the lower shear knives are counteracted by the compressive shear forces acting on the lower shear knives.

A yet further object is to provide such a strip shearing apparatus in which the strips, sheets, or plates to be sheared need not pass through the shear knives during processing, thereby avoiding scratches which are often occasioned by such passage.

Another object is to provide such a strip shearing apparatus with novel means for maintaining the upper and lower shear knives in perfect alignment with each other.

Still another object is to provide such a shearing apparatus with novel means for adjusting the amount of vertical clearance between the upper and lower shear knives through radial movement of the upper shear knife support shaft.

Another object is to provide such a shearing apparatus in which adjustable strip clamps are mounted on the lower shear frame for frictionally engaging the edge of the strips initially contacted by the upper shear knives during the cutting operation.

A further object is to provide such a shearing apparatus in which an additional shear knife may be mounted on the movable shear carriage immediately behind the upper shear knives previously described and disposed at a predetermined angle for beveling the previously cut edges of the strip during a single pass.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing:

FIG. 4 is a fragmentary enlarged side elevation view of the movable shear carriage and strip clamp assemblies of FIG. 1, with portions of the main support frame broken away to show the drive connection between the drive mechanism and shear carriage.

Figure 1:
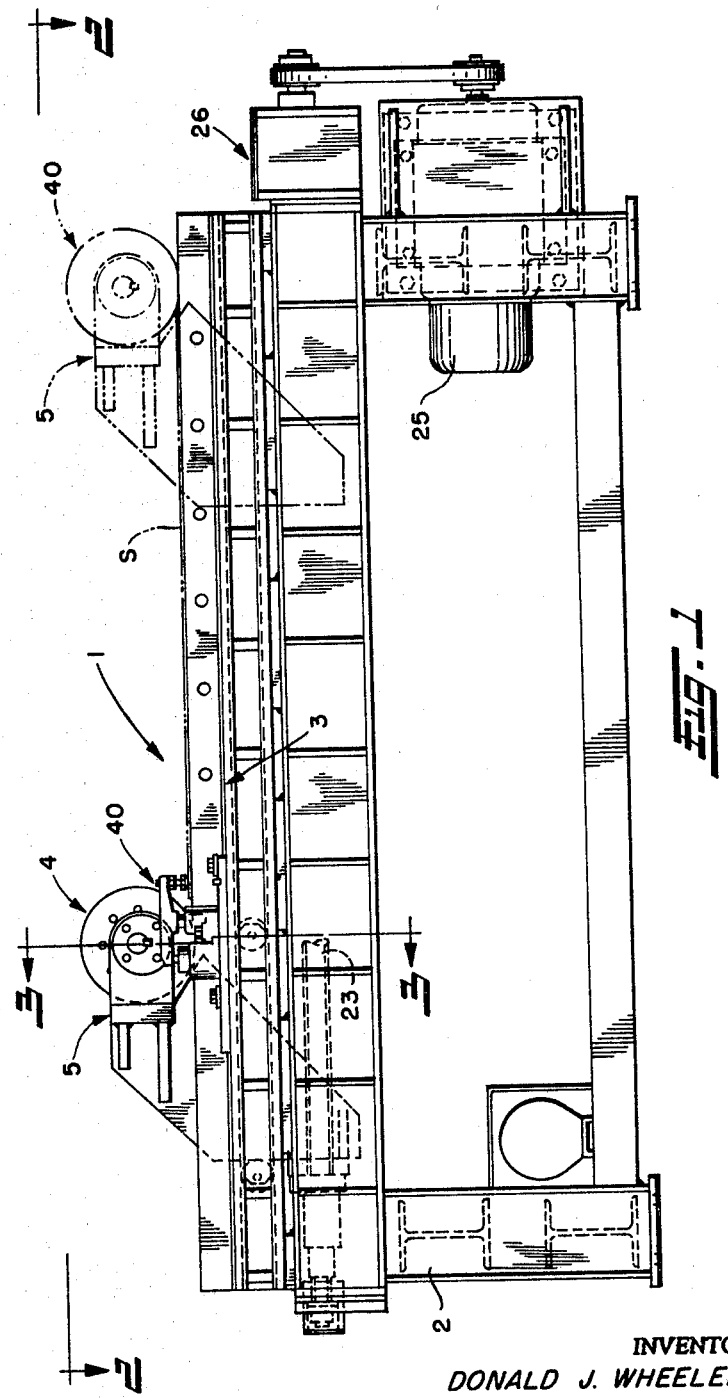
FIG. 1 is a side elevation view of a preferred form of strip shearing apparatus constructed in accordance with this invention.

Turning now to the details of the strip shearing apparatus 1 illustrated by way of example in the drawing, such apparatus generally comprises a main support frame 2 on which there is mounted a lower stationary shear blade assembly 3, and an upper movable shear blade assembly 4 supported by a carriage 5 for movement longitudinally of the lower shear blade assembly 3. The lower shear blade assembly 3 may be of the usual construction, consisting of a pair of laterally spaced rectangular shear knives 6 bolted or otherwise secured to shear block housings 7 welded to the main frame 2.

The upper shear blade assembly 4, on the other hand, preferably consists of a pair of circular shear knives 10 mounted on the carriage 5 for movement between the stationary shear knives 6 transversely across a strip, sheet, or plate to be sheared. Heretofore, it has been the usual practice to provide a large upper superstructure for supporting the upper shear blade assembly 4 above the lower shear blade assembly 3 to absorb the shearing forces created during the shearing operation which tend to lift the upper shear knives 10 away from the stationary lower shear knives 6. In addition, other costly and complicated force equalizing devices were often used, including rack and pinion hydraulic balancing devices as well as mechanical linkages, to name a few. However, it has been found that if the upper shear blades are supported from below the lower stationary shear blades in a manner to be fully described hereafter, such a superstructure and equalizing devices may be eliminated, since the compressive forces acting on the lower shear knives effectively offset or neutralize the shearing forces acting on the upper shear knives.

Figure 3:
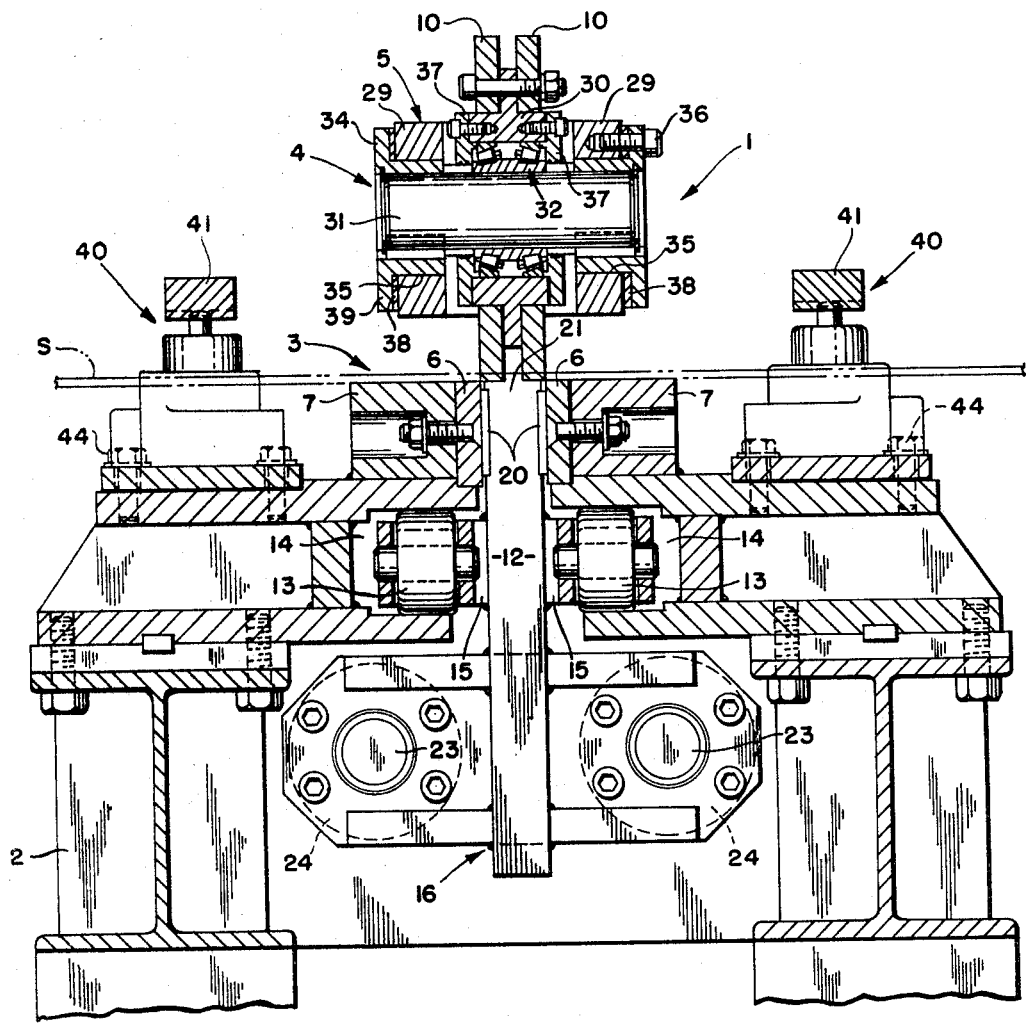
FIG. 3 is a transverse vertical section taken on the plane of the line 3—3, FIG. 1.

The mounting for the carriage 5 is perhaps best seen in FIGS. 3 and 4, wherein the carriage 5 is shown having a center plate 12 extending downwardly therefrom between the stationary shear knives 6 rearwardly of the upper shear knives 10, with rollers 13 on the center plate 12 received in machined guideways 14 supported by the main frame 2 immediately below the respective shear block housings 7. Although the number and spacing of such rollers 13 may obviously be varied in accordance with the shear forces developed, a minimum number of two such rollers for each guideway 14 is required, one roller 13 in each guideway preferably being located approximately directly below the upper shear knives 10 on extensions 15 from the center plate 12 and the other roller located adjacent the rear of the center plate 12. The carriage 11, center plate 12, and extension 15 together provide a frame 16 in the shape of a C in which the opposing forces developed in the lower and upper shear blades 6 and 10, respectively, are self-contained, whereby the compressive forces acting on the lower shear knives 6 neutralize the forces acting on the upper shear knives 10. Moreover, since the frame 16 and upper shear blades 10 traverse the strip, sheet, or plate during shearing, equalizing devices are not necessary.

The center plate 12, in addition to supporting the carriage 11 as aforesaid, also accurately maintains the side clearance between the upper circular shear blades 10 and lower shear blades 6. For that purpose, wear plates 20 or the like may be fastened to opposite sides of the center plate 12, with the spacing between the outer faces of the wear plates 20 being equal to the spacing between the stationary shear blades 6. Moreover, the forward edge 21 of the center plate 12 is preferably tapered at an angle of approximately 45 degrees and hardened to deflect the scrap material from between the lower shear knives 6 as it is cut from the strip during the shearing operation. A pair of drive screws 23 having their ends suitably journalled in the main frame 2 threadedly engage ball nuts 24 carried by the center plate 12 below the guideways 14, and a reversible electric motor 25 bolted to the main frame 2 is connected to the drive screws 23 through a drive coupling 26, whereby driving of the motor 25 in opposite directions will cause the carriage 5 to move back and forth along the guideways 14.

The circular shear knives 10 are eccentrically mounted on the carriage 5 between a pair of horizontal support arms 29 by a hub 30 journalled on a support shaft 31 by a roller bearing assembly 32, with the ends of the shaft 31 keyed in eccentric bushings 34 received in bores 35 in the support arms 29 and secured thereto by cap screws 36 or the like. Such an eccentric mounting of the circular shear knives 10 makes it a simple matter to adjust the vertical height or clearance between the circular shear knives 10 and stationary shear knives 6 as when it is desired to compensate for wear or adjust the clearance in accordance with the requirements for shearing different strip thicknesses, it only being necessary to remove the cap screws 36 and rotate the eccentric bushings 34 and shaft 31 keyed thereto within the bores 35 of the support arms 29 until the desired clearance is obtained.

Retainers 37 may be secured to the hub 30 adjacent opposite ends of the roller bearing assembly 32 for holding the same in place. Moreover, shims 38 may be disposed between the bushing flanges 39 and support arms 29 for for accurately locating the circular shear knives 10 with respect to the stationary shear blades 6.

During shearing, the position of the strip, plate, or sheet is accurately maintained by a pair of clamp assemblies 40 mounted on the main frame 2 on opposite sides of the lower shear blade assembly 3 adjacent the edge of the strip to be first contacted by the upper shear knives 10. The clamp assemblies 40 each include a swing clamp 41 supported by a base plate 42 having a plurality of elongated slots 43 therethrough, and cap screws 44 extending through the slots 43 into the main frame 2 which permit lateral adjustment of the clamp assemblies 40 to suit any width of strip that is to be sheared.

Figure 2:
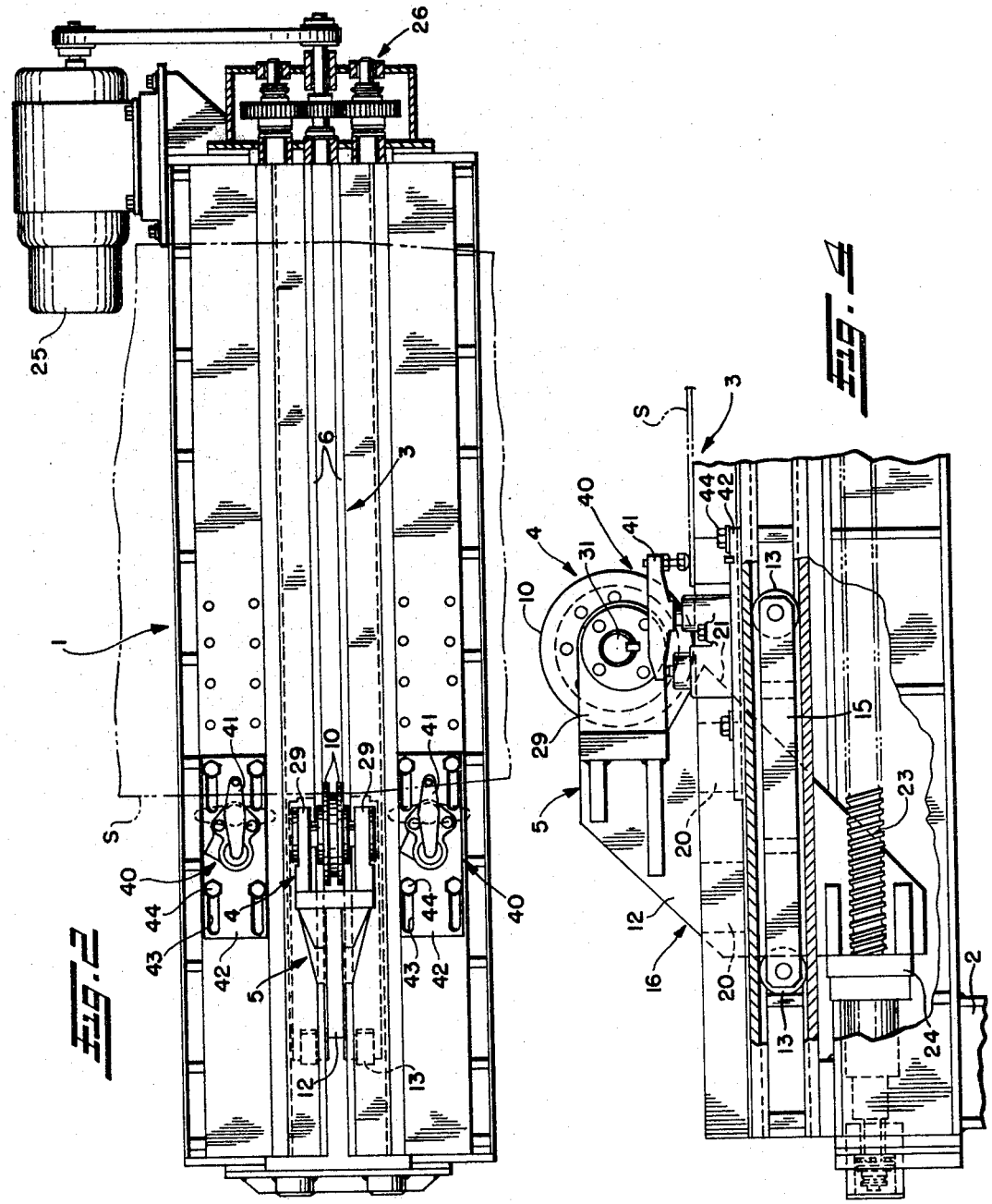
FIG. 2 is a top plan view of the apparatus of FIG. 1, partially broken away at one end to show the carriage drive mechanism.

In operation, the strip shearing apparatus 1 is disposed in a strip processing line with the carriage 5 initially retracted as shown in solid lines in FIGS. 1 and 2 to permit free flow of strip material S adjacent the upper shear knives 10 for processing without scratching the strip, which often occurs where the strip passes between the upper and lower shear knives 10 and 6, respectively. Thus, the apparatus 1 may be located adjacent to a recoiler or uncoiler having varying pass lines without fear of damaging the shear knives or material being processed.

When it is desired to shear the strip to remove an uneven end portion or a welded joint or other irregularity therefrom, the strip is halted with that portion of the strip located adjacent the stationary shear knives 6 and the clamp assemblies 40 are adjusted to firmly engage the edge of the strip to be first contacted by the upper shear knives 10 to prevent the strip material from gathering during cutting. Then the carriage 5 is caused to traverse the strip, during which the upper shear knives 10 cut the scrap material from the strip while the forward edge 21 of the center plate 12 deflects the scrap material downwardly between the lower shear knives 6.

While only one pair of upper shear knives 10 is shown mounted on the carriage 11, it should be understood that other shear knives could be carried by the carriage 11 directly behind the shear knives 10 and set at a predetermined angle for beveling the sheared edges of the strip during a single pass.

From the above discussion, it can now be seen that the strip shearing apparatus of the present invention is of a unique and simple construction which is especially suited for shearing strip, sheet, and plate material of different widths, and includes a novel carriage arrangement for the upper shear knives which is suported from below the stationary shear knives in such a manner that the shearing forces are neutralized. Moreover, the upper shear knives are radially adjustable for varying the amount of vertical clearance between the upper and lower shear knives as desired.

Other modes of applying the principles of the invention may be employed, change being made as regards the details described, provided the features stated in any of the following claims or the equivalent of such be employed.

I therefore, particularly point out and distinctly claim as my invention:

1. In a shearing apparatus, a frame, a stationary shear assembly supported by said frame at a shear position, means mounted on said frame for clamping the material to be sheared in such shear position, a movable shear assembly disposed above said stationary shear assembly, and means mounting said movable shear assembly for transverse movement across such material at such shear position, said movable shear assembly being adapted to cooperate with said stationary shear assembly during such transverse movement for shearing such material, said mounting means for said movable shear assembly being supported below said stationary shear assembly, whereby the compressive forces acting on the stationary shear assembly during shearing will act through said mounting means for said movable shear assembly to neutralize the opposing forces acting on said movable shear assembly; said stationary shear assembly comprising a pair of laterally spaced shear knives; said movable shear assembly comprising a carriage on which there is mounted rotatable shear knife means adapted to cooperate with said stationary shear knives shearing material as aforesaid; and said means mounting said movable shear assembly for such transverse movement comprising a center plate extending downwardly from said carriage between said stationary shear knives rearwardly of said rotatable shear knife means, and means supporting said center plate below said stationary shear knives for longitudinal movement therebetween, said center plate being of the same thickness as the spacing between said stationary shear knives for accurately maintaining the desired side clearance between said rotatable shear knife means and stationary shear knives.

2. In a shearing apparatus, a frame, a stationary shear assembly supported by said frame at a shear position, means mounted on said frame for clamping the material to be sheared in such shear position, a movable shear assembly disposed above said stationary shear assembly, and means mounting said movable shear assembly for transverse movement across such material at such shear position, said movable shear assembly being adapted to cooperate with said stationary shear assembly during such transverse movement for shearing such material, said mounting means for said movable shear assembly being supported below said stationary shear assembly, whereby the compressive forces acting on the stationary shear assembly during shearing will act through said mounting means for said movable shear assembly to neutralize the opposing forces acting on said movable shear assembly; said stationary shear assembly comprising a pair of laterally spaced shear knives; said movable shear assembly comprising a carriage on which there is mounted rotatable shear knife means adapted to cooperate with said stationary shear knives for shearing material as aforesaid; and said means mounting said movable shear assembly for such transverse movement comprising a center plate extending downwardly from said carriage between said stationary shear knives rearwardly of said rotatable shear knife means, and means supporting said center plate below said stationary shear knives for longitudinal movement therebetween comprising a plurality of rollers carried by said center plate which are adapted to be received in guideways directly below said stationary shear knives, said center plate having an extension below said stationary shear knives which projects underneath said rotatable shear knife means to provide greater support for said movable shear assembly, said center plate being of the same thickness as the space in between said stationary shear knives for accurately maintaining the desired side clearance between said rotatable shear knife means and stationary shear knives, the forward edge of said center plate being tapered and hardened for deflecting the scrap material downwardly from between said stationary shear knives during shearing; and means are provided for eccentrically mounting said rotatable shear knife means on said carriage to permit adjustment of the vertical clearance between said rotatable shear knife means and stationary shear knives, as desired.

3. The shearing apparatus of claim 1 wherein said means supporting said center plate below said stationary shear knives for longitudinal movement therebetween comprises a plurality of rollers carried by said center plate which are adapted to be received in guideways directly below said stationary shear knives, said center plate having an extension below said stationary shear knives which projects underneath said rotatable shear knife means with two of said rollers mounted on said extension substantially directly below said rotatable shear knife means to provide greater support for said movable shear assembly.

4. The shearing apparatus of claim 1 wherein there are two of said clamping means, one adjacent each side of said stationary shear assembly, said clamping means comprising a swing clamp, and a base plate for supporting said swing clamp adjacent the edge of such material to be first contacted by said movable shear assembly during shearing, said base plate having elongated slots therein, and screws extending through said slots into said frame for permitting lateral adjustment of said swing clamp toward and away from such material to suit different material widths.

5. In a shearing apparatus, a frame, a stationary shear assembly supported by said frame at a shear position, means for clamping the material to be sheared in such shear position, a movable shear assembly disposed above said stationary shear assembly, and means mounting said movable shear assembly for transverse movement across such material at such shear position, said movable shear assembly being adapted to cooperate with said stationary shear assembly during such transverse movement for shearing such material, said mounting means for said movable shear assembly being supported below said stationary shear assembly, whereby the compressive forces acting on the stationary shear assembly during shearing will act through said mounting means for said movable shear assembly to neutralize the opposing forces acting on said movable shear assembly; said stationary shear assembly comprising a pair of laterally spaced shear knives; said movable shear assembly comprising a carriage on which there is mounted rotatable shear knife means adapted to cooperate with said stationary shear knives for shearing material as aforesaid; and said means mounting said movable shear assembly for such transverse movement comprising a center plate extending downwardly from said carriage between said stationary shear knives rearwardly of said rotatable shear knife means, and means supporting said center plate below said stationary shear knives for longitudinal movement therebetween; and means for eccentrically mounting said rotatable shear knife means on said carriage to permit adjustment of the vertical clearance between said rotatable shear knife means and stationary shear knives, said eccentric mounting means comprising a hub to which said rotatable shear knife means is secured, a support shaft on which said hub is journalled, said rotatable shear knife means and hub being disposed between a pair of horizontal support arms projecting from said carriage, said support arms having bores therein, eccentric bushings received in said bores, the ends of said support shaft being keyed in said eccentric bushings, and means permitting rotatable adjustment of said eccentric bushings for varying the radial position of said support shaft in said bores to adjust the vertical clearance between said rotatable shear knife means and stationary shear knives as aforesaid, said eccentric bushings having flanges thereon, and shims disposed between said flanges and support arms for accurately locating said rotatable shear knife means with respect to said stationary shear knives.

References Cited

UNITED STATES PATENTS

| | | | |
|---|---|---|---|
| 1,158,686 | 11/1915 | Henning | 83—614 X |
| 1,920,591 | 8/1933 | Pesci | 83—614 X |
| 2,307,452 | 1/1943 | Cohen | 83—503 X |
| 2,538,972 | 1/1951 | Magnani | 83—508 X |
| 2,643,720 | 6/1953 | Miles | 83—466 |
| 3,056,325 | 10/1962 | Hart | 83—487 |

FOREIGN PATENTS 584,058  9/1933  Germany.

ANDREW R. JUHASZ, Primary Examiner

U.S. Cl. X.R.

83—466, 487, 508, 614, 677